(12) United States Patent
Jones et al.

(10) Patent No.: US 6,233,656 B1
(45) Date of Patent: *May 15, 2001

(54) BANDWIDTH OPTIMIZATION CACHE

(75) Inventors: Darren Jones; Wei-Ting Lin, both of Mountain View, CA (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,950

(22) Filed: Dec. 22, 1997

(51) Int. Cl.$^7$ .................................................. G06F 12/08
(52) U.S. Cl. ............................................ 711/137; 711/213
(58) Field of Search .................................. 711/113, 118, 711/133, 137, 138, 139, 213

(56) References Cited

U.S. PATENT DOCUMENTS

| | | | | |
|---|---|---|---|---|
| 5,548,620 | * | 8/1996 | Rogers ................................. | 375/354 |
| 5,751,336 | * | 5/1998 | Aggarwal et al. ....................... | 348/7 |
| 5,884,028 | * | 3/1999 | Kindell et al. ......................... | 709/234 |

* cited by examiner

Primary Examiner—Kevin L. Ellis

(57) ABSTRACT

The present invention optimizes bus bandwidth utilization in an environment where bus accesses range in size from single word to multi-word burst accesses by prefetching and caching additional words when responding to a single word access request so that if the word is not found in cache, the single word request is converted into a multi-word fetch request. The present invention includes receiving a read request from a client; checking the contents of a cache to determine whether the cache contains information sought in the read request and returning the information from the cache if a cache hit results. If a cache miss results, a bus transaction is initiated by fetching a block of memory containing the information from a memory store, sending the information to the client, and caching the additional remaining information included with the fetched block of memory.

The present invention may be implemented using a bus interface having a cache, and which is responsive to a read request received from the client. The bus interface is coupled to the client and to a bus, the cache returning information from the cache if a cache hit results, otherwise the bus interface fetching a block of memory containing the information from a memory store through the bus, sending the information to the client, caching remaining information within the fetched block of memory that was not requested in the read request, if a cache miss results in response to the read request.

7 Claims, 4 Drawing Sheets

Control Synchronization

Data Synchronization

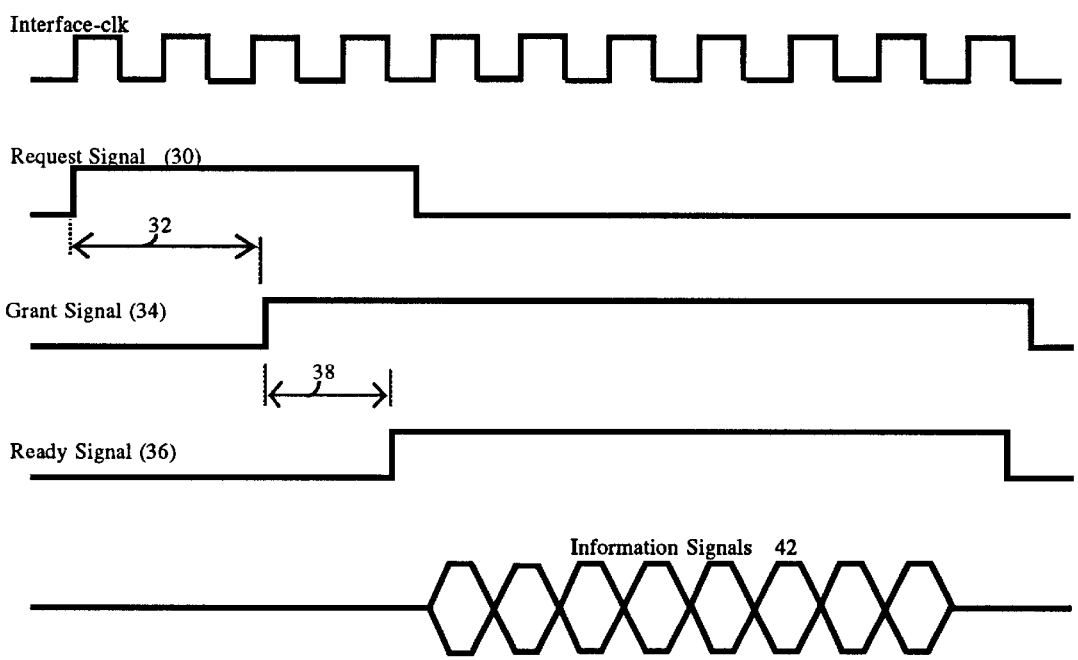

BANDWIDTH OPTIMIZATION CACHE

BACKGROUND OF THE INVENTION

1. Field of the Invention

The present invention relates to bus bandwidth utilization. More particularly, the present invention relates to optimizing bus bandwidth utilization in a high-latency, bursty bus environment by using a prefetch cache to hold data for multiple small-sized data request.

2. Background

In a high bus transaction environment where read accesses range from single word to multiple-word burst accesses it becomes important to optimize memory bus bandwidth utilization. Each read access requires some form of handshaking between a memory bus interface and a device sought to be accessed that are attached to the memory bus, such as a memory controller servicing a memory store. Each read access incurs a bandwidth overhead cost due to handshaking because handshaking consumes bus bandwidth that would have been otherwise available for transmitting access requests from other clients or additional data. Thus, single word accesses are more inefficient than multiple-word burst accesses because less data are transferred for a given bandwidth consumed.

Inefficient single word accesses take away bus time from other clients who may access the bus more efficiently such as clients that can perform large data access per request-grant handshake, further decreasing the memory bus interface's ability to provide optimum utilization of available memory bus bandwidth.

Moreover, in an environment where a memory controller servicing the data access through a memory bus needs to service high latency devices, such as hard drives, so that data may be transferred to another location through a high speed serial bus, such as a fibre channel bus, it becomes even more important that data accesses through the memory bus are performed efficiently.

Accordingly, it would be desirable to handle memory bus access requests of various sizes and without restricting clients to only performing large data fetches, while maintaining optimum utilization of the memory bus bandwidth.

SUMMARY OF THE INVENTION

The present invention optimizes bus bandwidth utilization in an environment where bus accesses range in size from single word to multi-word burst accesses by prefetching and caching additional words when responding to a single word access request so that if the word is not found in cache, the single word request is converted into a multi-word fetch request. The additional words in the fetch request are taken from the same line in memory in which the single word resides and stored in cache, increasing the chances that the next single word access by the client results in a cache hit. This optimizes the utilization of the bus bandwidth because the number of fetches through the memory bus is reduced through prefetching and when prefetching does occur, additional words besides the word requested are fetched.

In a preferred embodiment of the present invention, the method includes receiving a read request from a client; checking the contents of a cache to determine whether the cache contains information sought in the read request and returning the information from the cache if a cache hit results, If a cache miss results, a bus transaction is initiated by fetching a block of memory containing the information from a memory store, sending the information to the client, and caching the additional remaining information included with the fetched block of memory.

The bus transaction may further include synchronizing clock signals and handshake signals driving the cache with the clock signals and handshake signals driving to the bus and the memory store. Moreover, the method may further include maintaining cache consistency in the cache, while synchronization is being performed.

The method may be implemented using a bus interface having a cache, and which is responsive to a read request received from the client. The bus interface is coupled to the client and to a bus, the cache returning information from the cache if a cache hit otherwise the bus interface fetching a block of memory containing the information from a memory store through the bus, sending the information to the client, caching remaining information within the fetched block of memory that was not requested in the read request, if a cache miss results in response to the read request.

The implementation of the method may further include a synchronization devices for synchronizing clock signals and handshake signals driving the cache with clock signals and handshake signals driving the bus and the memory store. Moreover, the implementation may include a means for maintaining cache consistency in the cache, while the synchronization means is synchronizing the cache with the bus and memory store.

BRIEF DESCRIPTION OF THE DRAWINGS

FIG. 3 is a process diagram outlining a method of optimizing memory bus bandwidth utilization in accordance with a preferred embodiment of the present invention.

DETAILED DESCRIPTION OF A PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors operating under program control, or special purpose processors adapted to particular process steps and data structures, and that implementation of the process steps and data structures described herein would not require undue experimentation or further invention.

Apparatus and System Architecture

Figure 1:
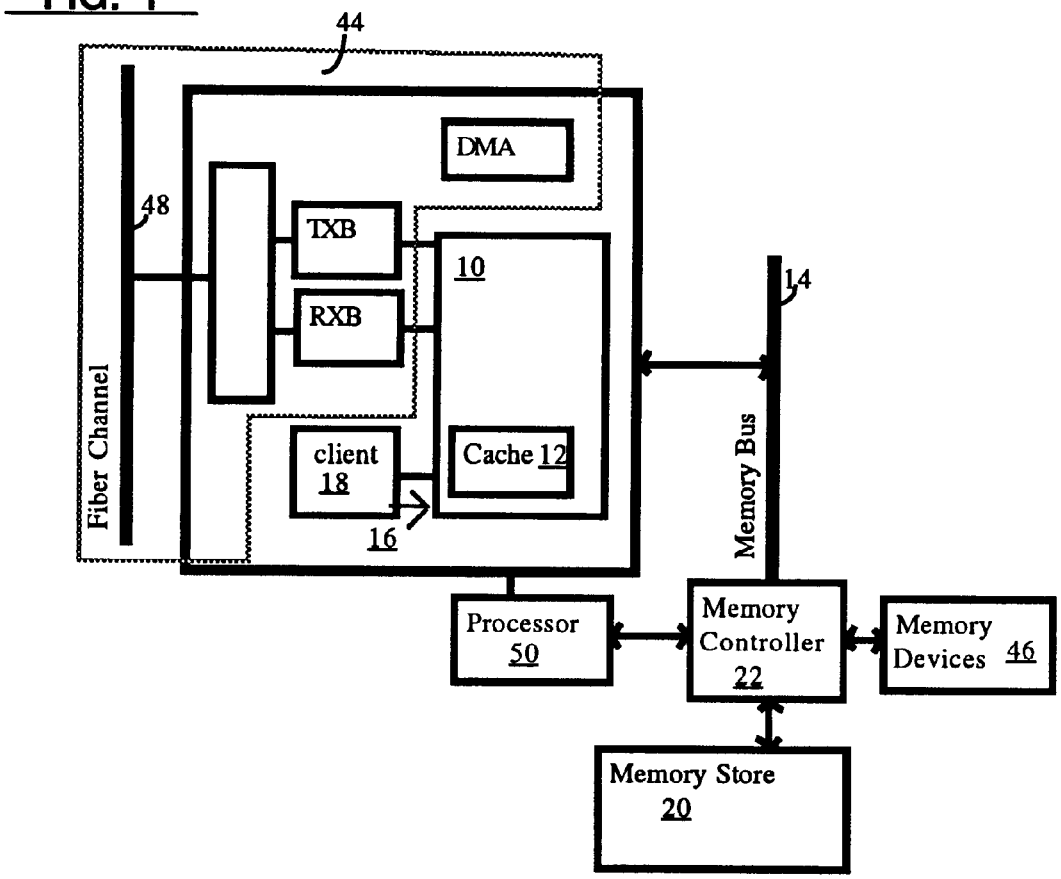
FIG. 1 is a block diagram depicting an apparatus and system that optimizes bandwidth utilization in a variable fetch data size capable memory bus in accordance with a preferred embodiment of the present invention.

FIG. 1 is a block diagram depicting an apparatus and system that optimizes bandwidth utilization in a variable fetch size capable memory bus in accordance with a preferred embodiment of the present invention.

The apparatus includes memory bus interface 10 that uses a cache 12 to reduce the number of small-sized fetches through memory bus 14 that result from small-sized access requests 16 made by client 18. Memory bus interface 10 responds to small-sized access requests 16 by determining whether cache 12 can provide the information requested and if so (i.e., a cache hit occurs), provides the information from cache 12 to client 18.

If instead a cache miss results, memory bus interface 10 performs a bus transaction that includes fetching from memory store 20, which is serviced by memory controller 22, the information requested plus additional information that belongs on the same line of memory in memory store 20 as the information requested. Upon reception of the fetched information through memory bus 14, the information requested is received from memory bus 14 and sent directly to client 18 without caching. The additional information within the fetched block of information is stored in cache 12. Due to spatial locality, the next information requested by client 18 is likely to be in cache 12.

In accordance with a presently preferred embodiment of the present invention, a LSI-P-3544 small-sized fetch is limited to fetches that retrieve a single word of information. Similarly, a small-sized access request is defined as a request for a single word of information that corresponds to a given address. A large-size fetch is limited to fetches that retrieves information through memory bus 14 through a multi-word burst access. Also, cache 12 is a 16 words×32 bits fully-associative cache that is content addressable.

Figure 2A:
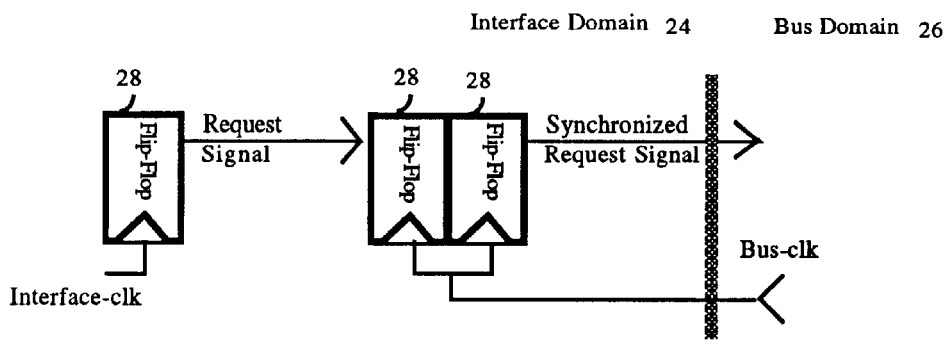
FIG. 2A is a block diagram of devices for maintaining control signal synchronization between a memory bus interface and a memory bus in accordance with a preferred embodiment of the present invention.
Figure 2B:
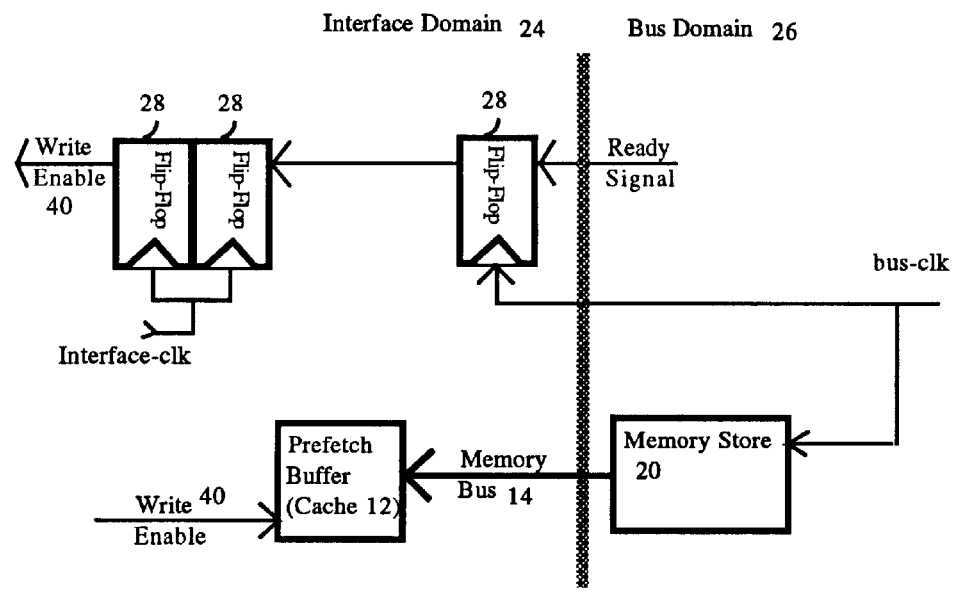
FIG. 2B is a block diagram of devices for maintaining data signal synchronization between a bus interface and a memory bus in accordance with a preferred embodiment of the present invention.

As shown in FIGS. 1–2B, in an alternative embodiment of the present invention, memory bus interface 10 may further include synchronization devices 28 that synchronizes the clock signals and handshake signals driving the devices within interface domain 24, which includes cache 12, with the clock signals and handshake signals driving devices within bus domain 26, which includes memory bus 14, memory controller 22, memory store 20, and the like. Flip-flops are used as the synchronization devices 28 for synchronizing the clock signals and handshake signals that drive devices in interface domain 24 with the clock signals and handshake signals that the devices in bus domain 26, as shown in FIG. 2A–2B. Synchronization using flip-flops is not meant to limit the invention in any way. Other synchronization implementations may also be used in lieu of the approach shown in FIGS. 2A–2B, as known by one reasonably skilled in the art.

FIG. 3 is timing diagram of a bus transaction in accordance with a preferred embodiment of the present invention.

Referring to FIGS. 1 and 3, a bus transaction is initiated after a request-grant handshake is completed between memory bus interface 10 and memory controller 22, or an equivalent device coupled to memory bus 14. Request 30 is generated by memory bus interface when requesting a fetch from memory store 20, or equivalent device, through memory controller 22. When ready and after some latency 32 due to synchronization, as discussed above with reference to FIG. 2A, memory controller responds with grant signal 34. Note that latency 32 can also include latency introduced by another client accessing memory store 32 during the same time the fetch request occurs.

The assertion of grant signal 34 results in a ready signal 36 being generated by memory controller 22, or equivalent device. Ready signal 36 is then synchronized as discussed above with reference to FIG. 2B, resulting in some latency 38 due to synchronization between interface domain 24 and bus domain 26 and memory latency. Latency 32 and latency 38 define the bandwidth overhead incurred for every bus transaction performed on memory bus 14. After synchronization is completed, a write enable signal 40 is generated resulting in the transfer of information signals 42 from memory store 20 to cache 12 via memory bus 14.

In another alternative embodiment of the present invention, memory bus interface 10 also includes a means for maintaining cache consistency in the cache, while synchronization devices 28 are synchronizing the devices within interface domain 24 and bus domain 26. For example, a cache consistency protocol may be followed that checks the current contents of the cache for consistency with the expected data and invalidates old data in the cache that has been replaced by any new data received.

Returning to FIG. 1, memory bus interface 10 is shown integrated with a system 44 for transferring information through memory bus 14, such as data and control signals, between high latency memory devices 46, such as devices including hard drives that may be buffered (via memory store 20) or unbuffered, and a high speed serial bus 48, such as a fibre channel bus. System 40 also includes a processor 50 running under program control that is treated by memory controller 22 as another requesting client. Memory bus interface not only services small-sized access requests from client 18, but may also service large-sized information requests from clients making multi-word burst access requests, such as transmission buffer 22 and receiving buffer 24 that are managed through DMA 26 for transferring information between memory bus 14 and high speed serial bus 48, such as a fibre channel bus. The fetches resulting from the multi-word burst access requests are not prefetched or cached by memory bus interface 10.

Method of Operation

Figure 4:
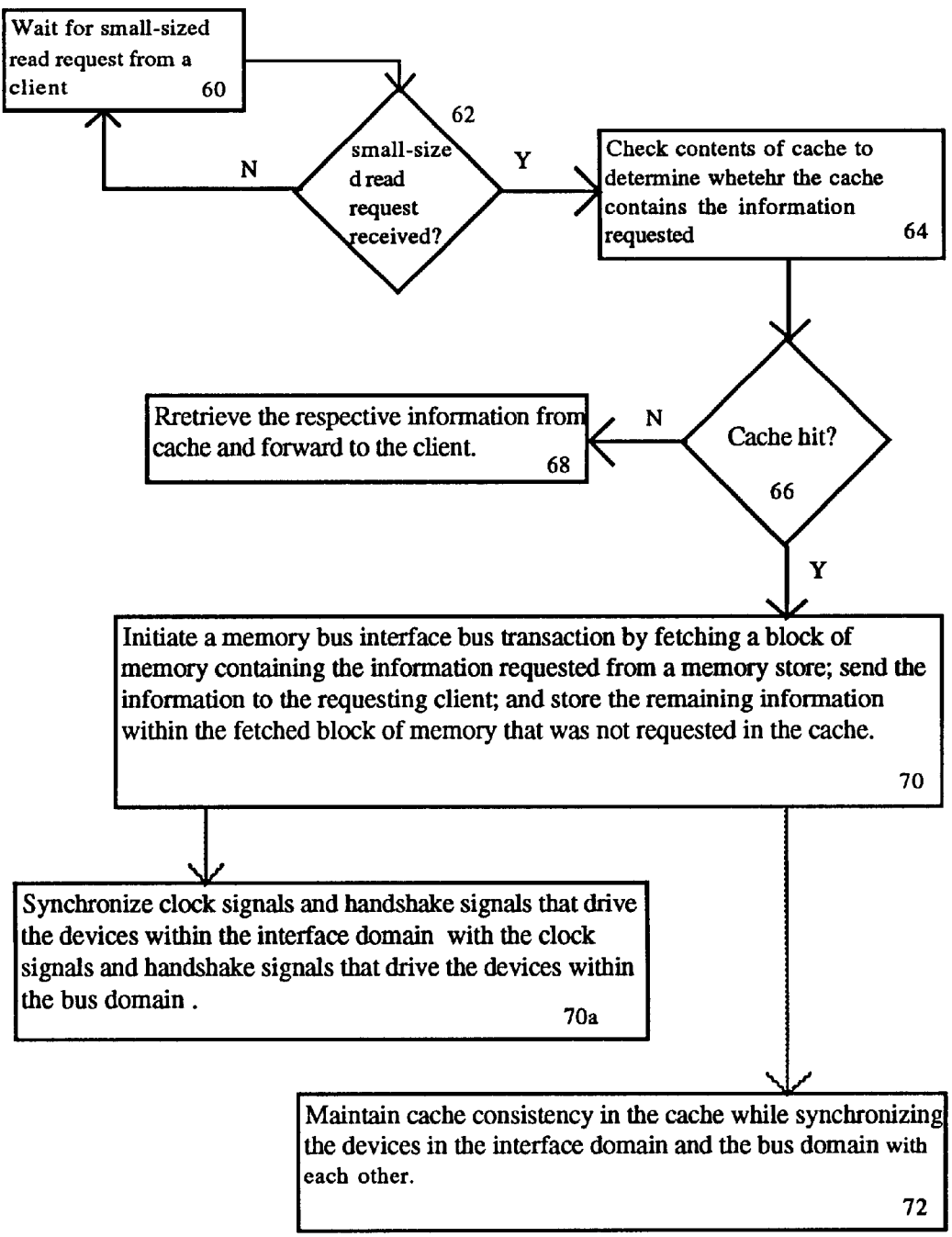
FIG. 4 is timing diagram of a various signals generated by the system employing a memory bus interface in accordance with a preferred embodiment of the present invention.

FIG. 4 is a process diagram outlining a method of optimizing memory bus bandwidth utilization in accordance with a preferred embodiment of the present invention.

At step 60, memory bus interface waits for a small-sized read request from a client In accordance with a preferred embodiment of the present invention, the small-sized read request includes a single word address.

At step 62, if a small-sized read request is received, step 64 is performed. Otherwise step 60 is performed.

At step 64, the contents of a cache is checked to determine whether the cache contains the information requested.

At step 66, if the information requested is in cache 12 (a cache hit occurred), step 68 is performed. Otherwise step 70 is performed.

At step 68, the information is retrieved from the cache and forwarded to the client and memory bus interface 10 waits for another small-sized read request by performing step 60.

If at step 66, the information requested is not in cache 12 (a cache miss occurred), step 70 is performed.

At step 70, memory bus interface 10 initiates a bus transaction by fetching a block of memory containing the information requested from memory store 20, sends the information to client 18. Memory bus interface 10 also stores the remaining information within the fetched block of memory that was not requested in cache 12. In accordance with a preferred embodiment of the present invention, the block of memory fetched is eight words long including the information requested.

In an alternative embodiment of the present invention, step 70 may further include a step 70a. At step 70a, synchronizing devices 28 synchronize the clock signals and handshake signals that drive the devices within interface domain 24 with the clock signals and handshake signals that drive the devices within bus domain 26.

In another alternative embodiment of the present invention, step 72 may also be included. At step 72, cache consistency is maintained in cache 12, while synchronizing the devices in interface domain 24 and bus domain 26. This further optimizes bandwidth utilization of memory bus 14 because step 72 is performed at a time where memory bus interface 12 would otherwise be precluded from receiving data.

While embodiments and applications of this invention have been shown and described, it would be apparent to those skilled in the art that many more modifications than mentioned above are possible without departing from the inventive concepts herein. The invention therefore, is not to be restricted except in the spirit of the appended claims.

What is claimed is:

1. A method for optimizing bus bandwidth utilization, the method comprising:

determining if a single word of data is contained in a cache;

completing a request-grant handshake between a memory bus interface and a memory controller if said single word of data is not contained in said cache;

initiating a bus transaction by generating a request for said single word of data in said memory bus interface if said single word of data is not contained in said cache;

generating a grant signal after waiting for a first latency time period for synchronization if said single word of data is not contained in said cache;

producing a ready signal after waiting for a second latency time period for synchronization if said single word of data is not contained in said cache;

creating a write-enable signal, said write-enable signal resulting in the transfer of eight contiguous words of data, at least one of which is said single word of data, from a memory store to said cache via said memory bus if said single word of data is not contained in said cache; and returning said single word of data from said cache.

2. The method of claim 1, wherein said single word of data is first in said eight contiguous words of data.

3. The method of claim 1, wherein said single word of data is last in said eight contiguous words of data.

4. A system for optimizing bus bandwidth utilization including:

means for determining if a single word of data is contained in a cache;

means for completing a request-grant handshake between a memory bus interface and a memory controller if said single word of data is not contained in said cache;

means for initiating a bus transaction by generating a request for said single word of data in said memory bus interface if said single word of data is not contained in said cache;

means for generating a grant signal after waiting for a first latency time period for synchronization if said single word of data is not contained in said cache;

means for producing a ready signal after waiting for a second latency time period for synchronization if said single word of data is not contained in said cache;

means for creating a write-enable signal, said write-enable signal resulting in the transfer of eight contiguous words of data, at least one of which is said single word of data, from a memory store to said cache via said memory bus if said single word of data is not contained in said cache; and means for returning said single word of data from said cache.

5. The system of claim 4, wherein said single word of data is first in said eight contiguous words of data.

6. The system of claim 4, wherein said single word of data is last in said eight contiguous words of data.

7. A program storage device readable by a machine, tangibly embodying a program of instructions executable by the machine to perform a method for optimizing bus bandwidth utilization, the method including:

determining if a single word of data is contained in a cache;

completing a request-grant handshake between a memory bus interface and a memory controller if said single word of data is not contained in said cache;

initiating a bus transaction by generating a request for said single word of data in said memory bus interface if said single word of data is not contained in said cache;

generating a grant signal after waiting for a first latency time period for synchronization if said single word of data is not contained in said cache;

producing a ready signal after waiting for a second latency time period for synchronization if said single word of data is not contained in said cache;

creating a write-enable signal, said write-enable signal resulting in the transfer of eight contiguous words of data, at least one of which is said single word of data, from a memory store to said cache via said memory bus if said single word of data is not contained in said cache; and returning said single word of data from said cache.

\* \* \* \* \*